(12) United States Patent
Tokura

(10) Patent No.: US 6,463,228 B2
(45) Date of Patent: Oct. 8, 2002

(54) PRINT PROCESSING APPARATUS AND PRINT PROCESSING METHOD

(75) Inventor: Yutaka Tokura, Ebina (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/760,655

(22) Filed: Jan. 17, 2001

(65) Prior Publication Data

US 2001/0019671 A1 Sep. 6, 2001

(30) Foreign Application Priority Data

Jan. 26, 2000 (JP) .......................... 2000-016946

(51) Int. Cl.$^7$ ............................ G03G 15/00; G06K 1/00
(52) U.S. Cl. ....................... 399/82; 358/1.13; 358/1.14; 358/1.15; 399/85; 399/87
(58) Field of Search ..................... 358/1.13, 1.14, 358/1.15; 399/81, 82, 83, 85, 87

(56) References Cited

U.S. PATENT DOCUMENTS 6,137,588 A * 10/2000 Deen et al. ............... 358/1.15

* cited by examiner

Primary Examiner—Hoang Ngo
(74) Attorney, Agent, or Firm—Fitzpatrick, Cella, Harper & Scinto

(57) ABSTRACT

Delivery information of a recording paper is obtained. When a delivery order is a descending order, a printing page order is set to the descending order and, thereafter, a print job is received and analyzed, thereby confirming that the printing page order is the descending order. After that, image data of all pages is generated and an occupation command of a print processor is issued. Subsequently, the image data is outputted and, after completion of the output of images of all pages, the occupation command of the print processor is released.

15 Claims, 7 Drawing Sheets

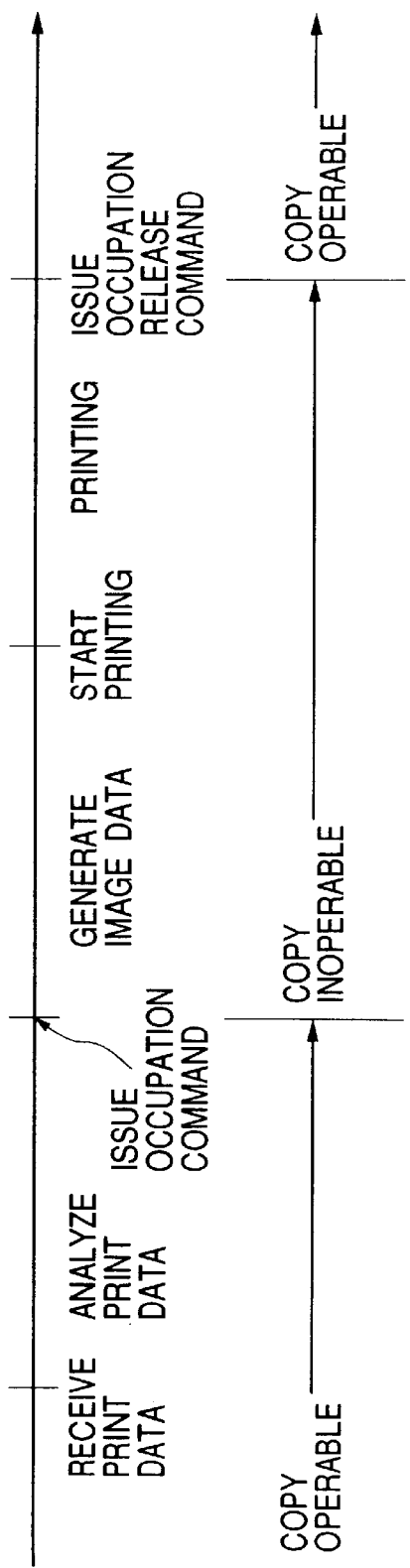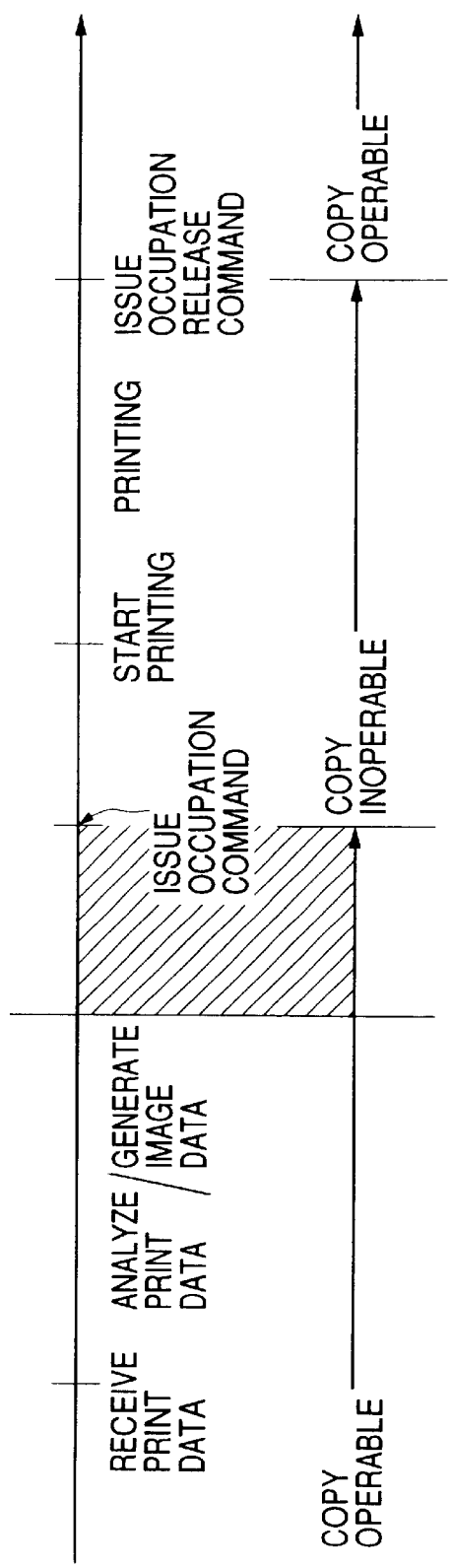

PRINT PROCESSING APPARATUS AND PRINT PROCESSING METHOD

BACKGROUND OF THE INVENTION

1. Field of the Invention

The invention relates to a print processing apparatus and a print processing method. More particularly, the invention relates to a print processing apparatus comprising image processor for performing a predetermined image process to a print job sent from an information processing apparatus such as a host computer or the like and image reader for performing a reading process of image data and to a print processing method for such an apparatus.

2. Related Background Art

Hitherto, there has been known a print processing apparatus which performs a reading process of image data and is connected to an information processing apparatus such as a host computer or the like through a network and can print and output a print job sent from the information processing apparatus.

Hitherto, in such a kind of print processing apparatus, as shown in FIG. 6, a print job is sequentially transmitted from an information processing apparatus 101 to a print processing apparatus 102 in ascending order from the first page to the second page, third page, . . . , (n−1)th page, and nth page.

Whether the image data is outputted in ascending order or descending order is discriminated by a print controller of the print processing apparatus 102. In case of outputting the image data in ascending order, as shown in FIG. 7A, the image data is sequentially outputted onto a paper tray 103 in receiving order from the first page. In case of outputting the image data in descending order, as shown in FIG. 7B, the image data is sequentially outputted onto the paper tray 103 in order opposite to the receiving order from the nth page.

In the print processing apparatus, in order to avoid a situation such that printing of the image data read by an image reader and the print output of the image data from the information processing apparatus 101 compete in a print processor, each of the image reader and the print processing apparatus issues an occupation command of the print controller when a printing process is executed and issues an occupation release command after completion of an outputting process.

However, in the above conventional print processing apparatus, in case of outputting the image data transferred from the information processing apparatus, although the image data is outputted as it is in receiving order when it is outputted in ascending order, it is necessary to output the image data in order opposite to the receiving order when it is outputted in descending order. Therefore, after the occupation command of the print controller was issued to the print controller, the outputting order of the image data is changed to the descending order and, thereafter, a print job described by a PDL (page description language) is rasterized to thereby form image data, and the image data is outputted from the print processor.

In the conventional image processing apparatus, therefore, there is a problem that in case of outputting the image data in descending order, an image job from the image reader cannot be executed for a time interval until the print job is received from the information processing apparatus 101 and the print is started.

Moreover, in the case where the print processing apparatus having the image reader is connected to the network and used, in many cases, a plurality of users share the print processing apparatus. There are, consequently, problems such that the image data cannot be read for a long time when a plurality of users continuously transfer the print jobs to the print processing apparatus, and a working ratio of the print processing apparatus also deteriorates.

SUMMARY OF THE INVENTION

The invention is made in consideration of the above problems and it is an object of the invention to provide a print processing apparatus and a print processing method, in which a printing process can be highly efficiently performed.

To accomplish the above object, according to the invention, there is provided a print processing apparatus comprising: an image reader for performing a reading process of image data; an image processor for receiving a print job which is sent from external equipment and generating image data on the basis of the print job; and an output processor for selectively performing an outputting process to the print job received by the image reader or the image data read by the image reader on the basis of an occupation command which is issued by the image processor or the image reader, wherein the print processing apparatus further comprises a delivery information obtainer for obtaining paper delivery information of a recording paper which is outputted from the output processor, a delivery order determiner for determining a delivery order of the print jobs on the basis of an obtaining result of the delivery information obtainer, and a command issuance time determiner for determining a command issuance time of the occupation command for the output processor on the basis of a determination by the delivery order determiner.

The above and other objects and features of the present invention will become apparent from the following detailed description and the appended claims with reference to the accompanying drawings.

BRIEF DESCRIPTION OF THE DRAWINGS

FIGS. 4A and 4B are time charts showing the embodiment in case of outputting in descending order in comparison with a conventional example;

DETAILED DESCRIPTION OF THE PREFERRED EMBODIMENT

An embodiment of the invention will now be described hereinbelow with reference to the drawings.

Figure 1:
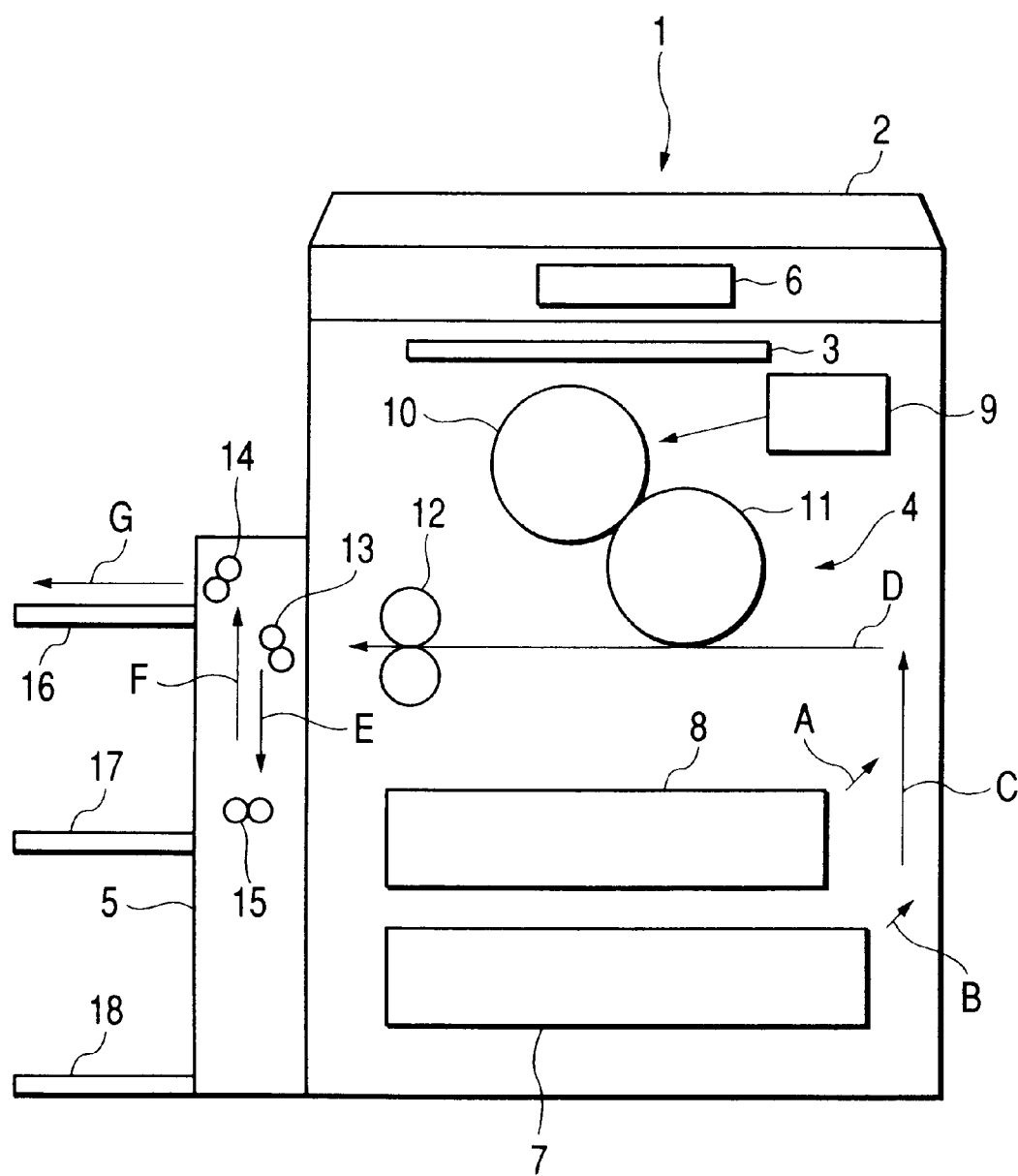
FIG. 1 is an internal structural diagram showing an embodiment of a print processing apparatus according to the invention.

FIG. 1 is an internal structural diagram showing an embodiment of a laser beam printer as a print processing apparatus according to the invention. A laser beam printer 1 comprises: an image reader 2 having a CCD or the like for performing a reading process of image data; a print controller 3 for performing a predetermined control to a print job transferred from a host computer, which will be explained hereinlater; a print processor 4 for outputting image data from the print controller 3 and image reader 2; a paper deliverer 5 for delivering a recording paper on which the image data has been formed; and an operation unit 6 having an LCD, a keyboard, and the like.

The print processor 4 mainly comprises: a plurality of paper cassettes (first and second paper cassettes 7 and 8) in which recording papers (cut sheets) are enclosed; a semiconductor laser driver 9 to which the image data outputted from the print controller 3 is inputted as a video signal; a photosensitive drum 10 for forming an electrostatic latent image by being irradiated by a laser beam which is emitted from the semiconductor laser driver 9; a transfer drum 11 for transferring the electrostatic latent image formed on the photosensitive drum 10 onto the recording paper; and a fixing unit 12 for fixing the image data transferred on the recording paper.

The paper deliverer 5 comprises: a plurality of feed rollers 13 and 14; a surface change-over switch 15 for switching the obverse and reverse of the recording paper; and a plurality of paper trays 16 to 18.

In the laser beam printer 1 constructed as mentioned above, the image data which is outputted from the print controller 3 is inputted as a video signal to the semiconductor laser driver 9. Subsequently, the semiconductor laser driver 9 on/off switches the laser beam in response to the inputted video signal. The laser beam scans and exposes the surface of the photosensitive drum 10. Thus, an electrostatic latent image of a character pattern or an image is formed on the photosensitive drum 10.

The recording papers enclosed in the first or second paper cassette 7 or 8 are conveyed one by one to the transfer drum 11 by feed rollers (not shown) via directions shown by arrows A and C.

The electrostatic latent image is visualized as a developing agent image and transferred onto the recording paper by the transfer drum 11.

Subsequently, the recording paper to which the image data has been transferred is conveyed in the direction of an arrow D and sent to the fixing unit 12. The image data is fixed on the recording paper by the fixing unit 12 and the paper is conveyed to a delivery path.

In case of outputting in ascending order, the recording paper is outputted as it is to the paper tray 16 via the feed rollers 13 and 14. In case of outputting in descending order, the recording paper is guided in the direction of an arrow E by the feed rollers 13, the obverse/reverse of the paper is reversed by the surface change-over switch 15, and the recording paper is guided in the direction of an arrow F and delivered to the paper tray 16 as shown by an arrow G.

The image reader 2 reads an image of an original put on an original glass plate and transfers the read image data to the print processor 4. The image data is outputted from the print processor 4.

Figure 2:
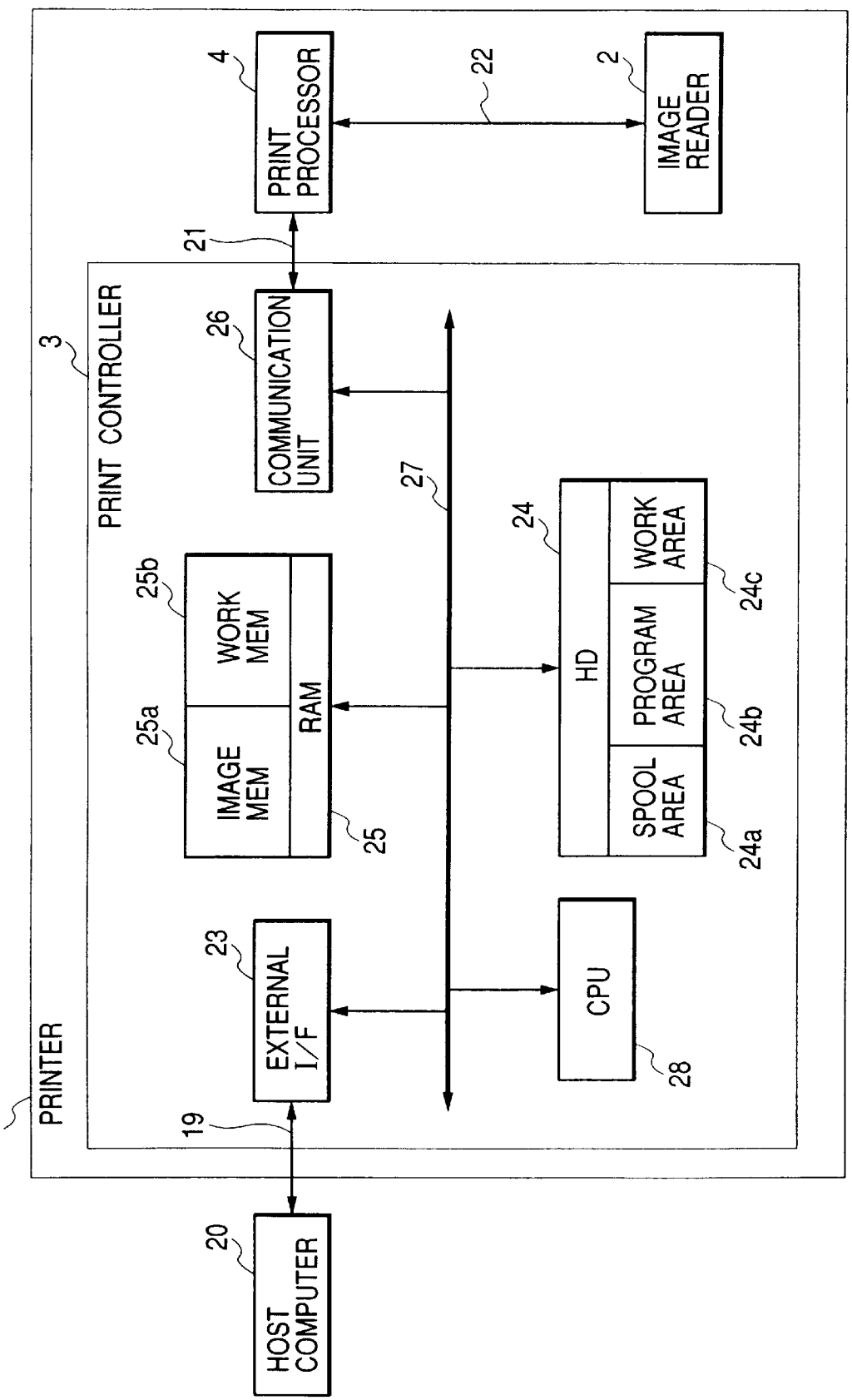
FIG. 2 is a block constructional diagram showing the details of a print controller.

FIG. 2 is a block constructional diagram showing the details of the print controller 3. The print controller 3 is connected to a host computer 20 through an interface 19 such as a network or the like. The print controller 3 is also connected to the print processor 4 through a first printer interface 21. Further, the print processor 4 is connected to the image reader 2 through a second printer interface 22.

Specifically speaking, the print controller 3 comprises: an external interface 23 for performing an interface operation between the I/F 23 and the host computer 20; a hard disk 24 in which a print job and the like which are transferred from the host computer 20 are stored; an RAM 25 for performing a storage of the image data which is outputted to the print processor 4, or the like; a communication unit 26 for performing a communication control between the unit 26 and the print processor 4; and a CPU 28 which is connected to the above component elements through a bus 27 and controls the whole apparatus.

The hard disk 24 has: a spool area 24a for storing the print job which is transferred from the host computer 20; a program area 24b in which a control program such as an output control program, which will be explained hereinlater, or the like has been stored; and a work area 24c which is used as a temporary work area of the CPU 28.

Further, the RAM 25 has: an image memory 25a for temporarily storing the image data which is outputted to the print processor 4; and a work memory 25b which is used as a work area of the CPU.

In the print controller 3, the print data sent from the host computer 20 through the interface 19 and external I/F 23 is once stored in the spool area 24a in the hard disk 24 under the control of the CPU 28. Subsequently, the print data read out from the spool area 24a is rasterized to thereby generate image data. The image data is written in the image memory 25a in the RAM 25. After that, the image data is read out from the image memory 25a, sent to the print processor 4 through the communication unit 26 and first printer I/F 21, visualized, and outputted from the print processor 4.

The control program stored in the program area 24b in the hard disk 24 is loaded into the work memory 25b in the RAM 25 and executed by the CPU 28. When an image is generated from the print data which is stored in the spool area 24a in the hard disk 24, it is generated page by page. The print data of each page from which an image is generated is once loaded into the work memory 25b in the RAM 25 from the spool area 24a in the hard disk 24, executed by the CPU 28, and written in the image memory 25a in the RAM 25.

Figure 3:
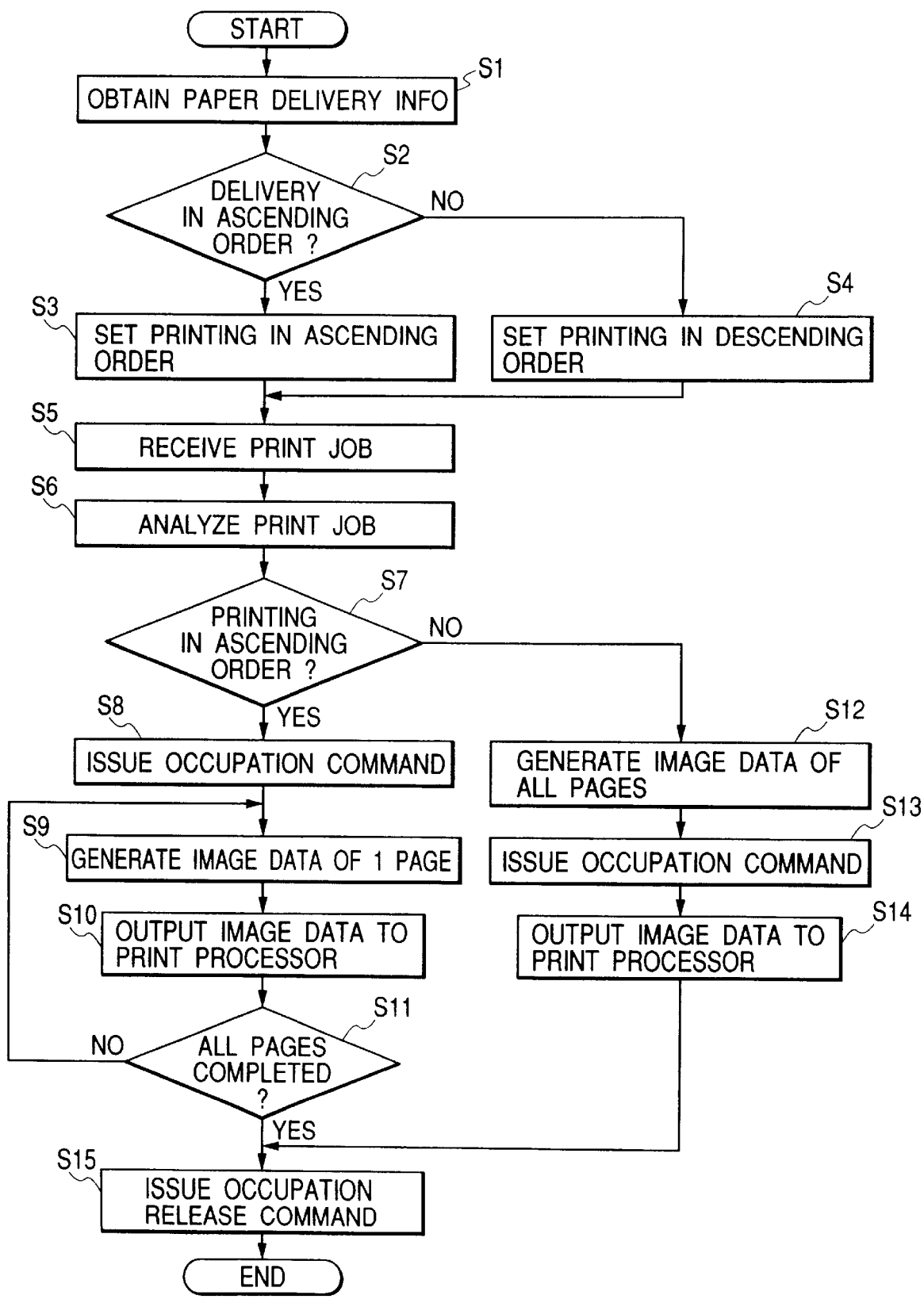
FIG. 3 is a flowchart showing an embodiment of a print processing method according to the invention.

FIG. 3 is a flowchart showing a print processing method of the invention.

First, after a power source of the print processor 4 was turned on, the print controller 3 obtains delivery information in step S1. That is, the print controller 3 obtains delivery information showing whether the deliverer 5 has been set into the laser beam printer 1 or not, the size and type of the paper which can be delivered, whether the image data is outputted in ascending order or not, and the like.

In step S2, delivery information is analyzed and whether the output mode has been set to the mode of outputting in ascending order or not is discriminated. If YES, step S3 follows. When the print job is sent from the host computer 20, the order of the pages to be outputted is set to the ascending order, and step S5 follows. If NO in step S2, the order of the pages to be outputted is set to the descending order in step S4 when the print job is sent from the host computer 20, and step S5 follows.

Subsequently, in step S5, the print job is received from the host computer 20 through the external I/F 23 and stored into the spool area 24a in the hard disk 24. In step S6, the contents of the print job are analyzed.

In step S7, whether the printing page order has been set to the ascending order in step S3 or not is discriminated. If YES, an occupation command of the print processor 4 is issued to the print processor 4 through the first printer I/F 21 in step S8. In step S9, the image data of the first page of the received print job is generated and stored in the image memory 25a. After that, the generated image data is outputted to the print processor 4 through the first printer I/F 21 (step S10). Subsequently, whether the output of all image data in the print job has been completed or not is discriminated (step S11). If the image data of all pages in the print job is not generated and the output of the image data is not completed, the processing routine is returned to step S9 and image data of the next page is generated. After that, an outputting process of the image data is performed in step S10. Whether the image data of all pages has been outputted or not is again discriminated in step S11.

If the output of the image data of all pages in the print job is finished, the answer in step S11 is YES. An occupation release command for releasing the occupation of the print processor 4 is issued to the print processor 4 through the first printer I/F 21 in step S15 and the processing routine is finished.

If NO in step S7, that is, if the printing page order has been set into the descending order in step S4, step S12 follows. All pages in the print job are rasterized to thereby generate the image data and the generated image data is stored in the image memory 25a. In step S13, the occupation command of the print processor 4 is issued to the print processor 4 through the first printer I/F 21. In step S14, the generated image data of all pages is outputted to the print processor 4 through the first printer I/F 21. After the image data of all pages was outputted, step S15 follows. The occupation release command of the print processor 4 is issued to the print processor 4 through the first printer I/F 21. The processing routine is finished.

In the rasterizing process of the print page in step S12, if a free capacity of the image memory 25a for storing the rasterized image data is equal to or less than a predetermined value, the processing routine advances to step S8 and the printing page order can be also forcedly switched to the page ascending order.

FIGS. 4A and 4B are time charts showing the embodiment in case of outputting in descending order in comparison with the conventional example. FIG. 4A shows the conventional example. FIG. 4B shows the embodiment. That is, in case of outputting in descending order, hitherto, as shown in FIG. 4A, the occupation command of the print processor 4 is issued, the outputting order of the recording papers is changed, and thereafter, the image data is generated, and the printing is started. Therefore, the image job (copying operation) from the image reader 2 cannot be executed also for a period of time that is necessary for image generation. According to the embodiment, however, the print data is analyzed, the image data is generated, thereafter, the occupation command of the print processor 4 is issued, and the printing process is started. Therefore, as shown in a hatched portion in FIG. 4B, even during the generation of the image data, the image job from the image reader 2 is executed and the copy is operable. Therefore, the copy inoperable time of the image job is reduced and the copy operable time from the image reader 2 can be extended.

That is, the print controller 3 controls the issuance of the occupation command of the print processor 4 and the generation and output of the image data, so that a working ratio of the print processor 4 can be improved by the time shown in the hatched portion in FIG. 4B as compared with the conventional one, and the print processing apparatus having an excellent use efficiency can be obtained.

Figure 5:
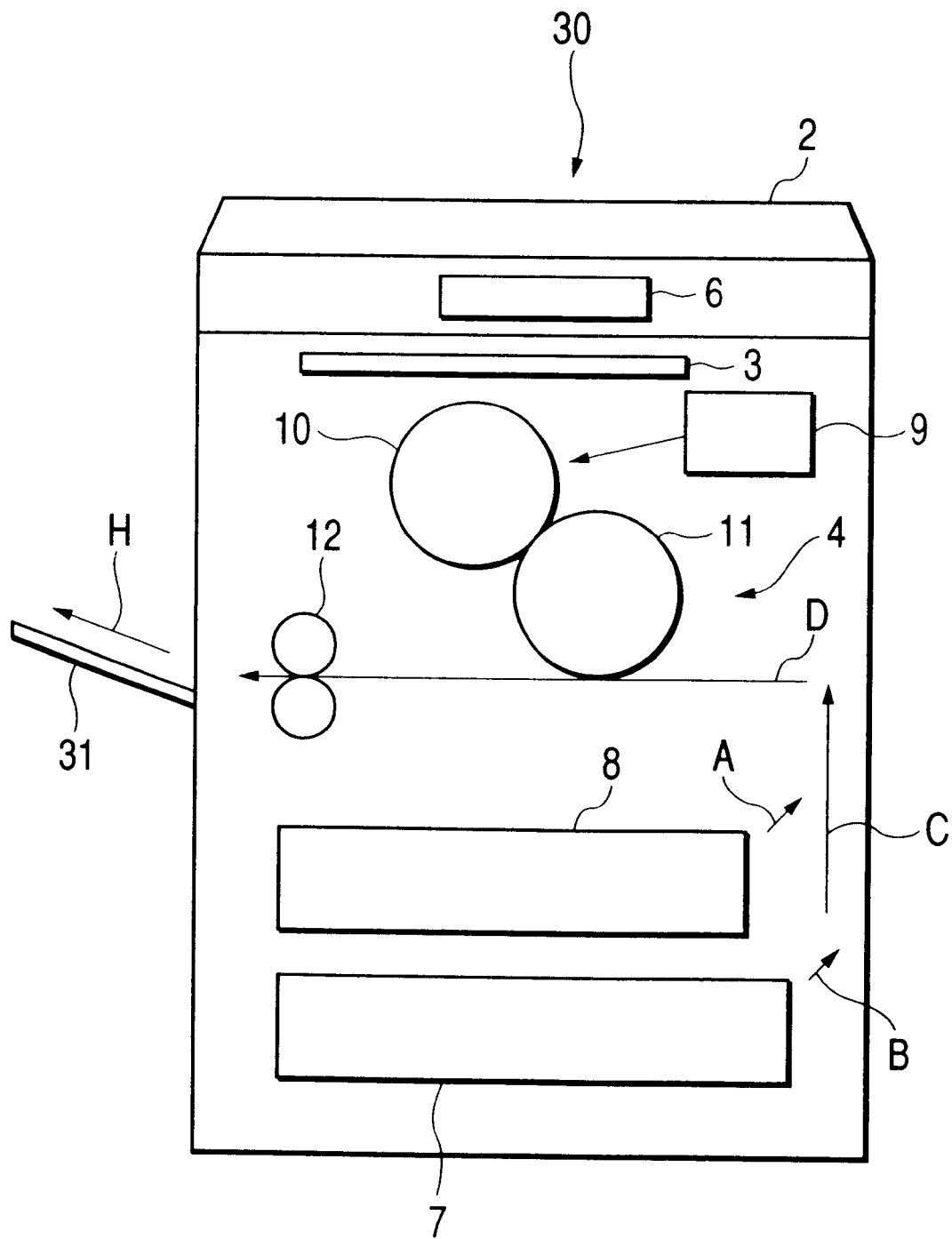
FIG. 5 is an internal structural diagram showing another embodiment of a print processing apparatus.
Figure 6:
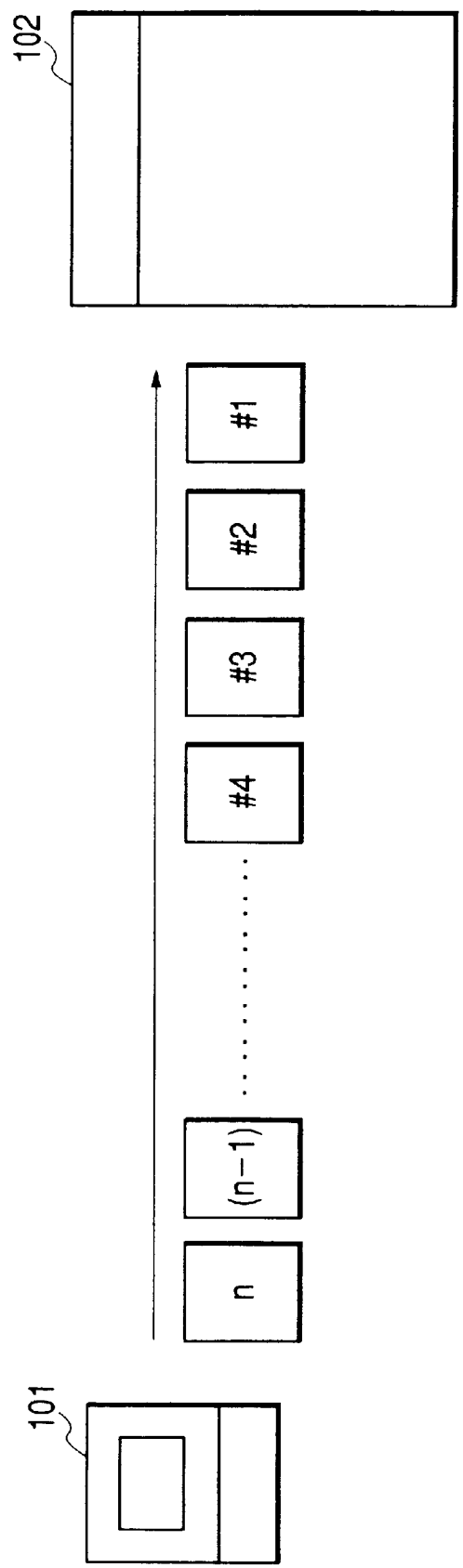
FIG. 6 is a diagram schematically showing a state where a print job is transferred from an information processing apparatus to the print processing apparatus.
Figure 7A:
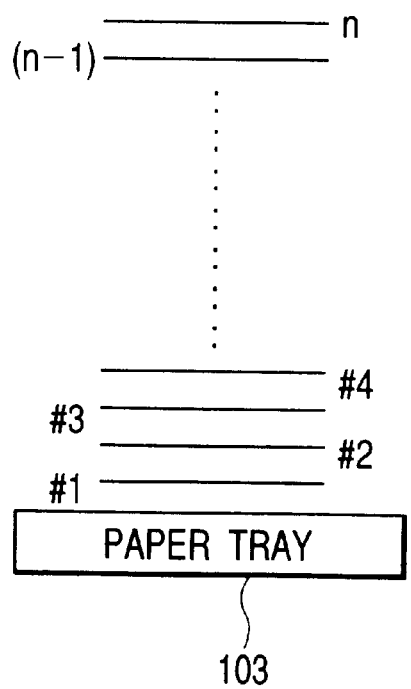
FIGS. 7A and 7B are diagrams of conventional examples each showing a state of a print job which is outputted from the print processing apparatus.
Figure 7B:
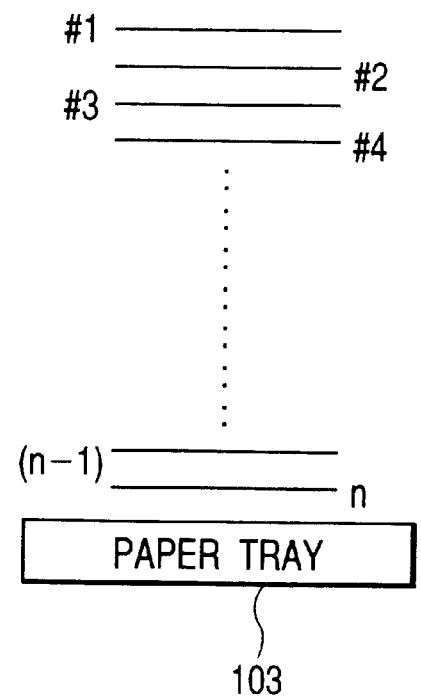

The invention is not limited to the above embodiment. Although the print processing apparatus 1 can use both ascending output form and descending output form owing to the paper delivery mechanism having a plurality of paper trays, the invention can be also similarly applied to a case where a print processing apparatus 30 has one paper tray 31 as shown in FIG. 5.

As mentioned in detail above, according to the invention, in the case where the outputting order of the print job is opposite to the receiving order, after the print job was converted into the image data, the occupation command of the output processor is issued. Therefore, after the reception of the print job, even during an interval until the start of the output, the job from the image reader can be executed.

Even in the case where the print job which is sent from the external equipment is complicated or the case where there are many data of the print job, an inconvenience such that the job from the image reader cannot be executed for a long time can be eliminated.

The objects of the invention can be also accomplished in a case where a memory medium in which program codes of software for realizing the functions of the embodiment as mentioned above have been stored is supplied to a computer (a CPU or an MPU) of a system or an apparatus, the computer reads out the program codes stored in the memory medium, and executes actual processes in accordance with instructions based on the program codes. In this case, the program codes themselves read out from the memory medium realize the functions of the embodiment as mentioned above, and the memory medium in which the program codes have been stored constructs the invention.

As a memory medium for supplying the program codes, for example, a floppy disk, a hard disk, an optical disk, a magnetooptic disk, a CD-ROM, a CD-R, a magnetic tape, a non-volatile memory card, an ROM, or the like can be used.

What is claimed is:

1. A print control apparatus comprising:
   an image processor for receiving a print job which is sent from external equipment and for generating image data on the basis of said print job;
   an image input unit for inputting image data from an image data source other than said external equipment;
   an output processor for selectively outputting the print job received by said image processor or the image data inputted by said image input unit on the basis of an occupation command which is issued by said image processor or said image input unit;
   a delivery information obtainer for obtaining paper delivery information of a recording paper which is outputted from said output processor;
   a delivery order determiner for determining a page outputting order of said output processor on the basis of an obtaining result of said delivery information obtainer; and
   a command issuance timing determiner for determining a command issuance timing of the occupation command for said output processor on the basis of a determination by said delivery order determiner.

2. An apparatus according to claim 1, wherein said image data source is an image reading apparatus.

3. An apparatus according to claim 1, wherein
   said delivery order determiner discriminates whether the outputting order of said print job is opposite to a receiving order of said print job or not on the basis of the obtaining result of said delivery information obtainer, and
   said command issuance timing determiner times issuance of the occupation command of said output processor after the generating process of said image data was performed by said image processor when it is determined by said discrimination of said delivery order determiner that said outputting order is the opposite order.

4. An apparatus according to claim 1, wherein said delivery order determiner discriminates whether an outputting order of said print job is the same as a receiving order of said print job or not on the basis of the obtaining result of said delivery information obtainer, and said command issuance timing determiner times issuance of the occupation command of said output processor before the generating process of said image data is performed by said image processor when it is determined by said discrimination of said delivery order determiner that said outputting order and said receiving order are the same order.

5. An apparatus according to claim 1, further comprising:

an output command unit for generating an output command of said image data after the occupation command of said output processor is issued; and a release unit for releasing the occupation command of said output processor when an output of all of the image data is finished by said output command unit.

6. An apparatus according to claim 1, further comprising:

a delivery controller for controlling a delivery order of recording papers.

7. An apparatus according to claim 1, wherein said external equipment is an information processing apparatus connected to said print control apparatus through a predetermined interface.

8. A print processing method having an image processing function for receiving a print job which is sent from external equipment and for generating image data on the basis of said print job, and having an image input function for inputting image data from an image data source other than said external equipment, whereby the print job received by said image processing function or the image data inputted by said image input function is selectively outputted on the basis of an occupation command of said image processing function or said image input function, wherein said method comprises the steps of:

obtaining delivery information of a recording paper to be outputted;

executing a delivery order determining process for determining a page outputting order of the recording paper on the basis of a result of said obtaining step; and determining a command issuance timing of said occupation command for said outputting process on the basis of a determination result of page outputting order by said delivery order determining process.

9. A method according to claim 8, wherein said image data source is an image reading apparatus.

10. A method according to claim 8, wherein in said delivery order determining process, whether an outputting order of said print job is opposite to a receiving order of said print job or not is discriminated on the basis of said delivery information, and when it is determined that said outputting order of said print job is opposite to the receiving order of said print job, said command issuance timing is set to a timing after the generating process of said image data was performed by said image processing function.

11. A method according to claim 8, wherein in said delivery order determining process, whether an outputting order of said print job is the same as a receiving order of said print job or not is discriminated on the basis of said delivery information, and when it is determined that the receiving order of said print job and said outputting order of said print job are the same order, said command issuance timing is set to a timing before the generating process of said image data is performed by said image processing function.

12. A method according to claim 8, wherein after the occupation command of said outputting process was issued, an output command of the image data is issued and, when the output of all image data is finished, the occupation command of said outputting process is released.

13. A print processing method comprising:

a receiving step of receiving a print job which is sent from external equipment;

a generating step of generating image data on the basis of the received print job;

an output step of outputting the generated image data by an image forming unit;

a command step of issuing an occupation command for occupying and using said image forming unit to said image forming unit;

a first determining step of obtaining delivery information of a recording paper to be outputted in said image forming unit and determining a page delivery order of said print job on the basis of a result of said obtaining process; and a second determining step of determining a command issuance timing of said occupation command on the basis of the determination of page delivery order in said first determining step.

14. A method according to claim 13, wherein in said first determining step, whether an outputting order of said print job is opposite to a receiving order of said print job or not is discriminated on the basis of said delivery information, and in said second determining step, when it is determined that said outputting order of said print job is opposite to the receiving order of said print job, said command issuance timing is set to a timing after the generating process of said image data by said generating step was performed.

15. A method according to claim 13, wherein in said first determining step, whether an outputting order of said print job is the same as a receiving order of said print job or not is discriminated on the basis of said delivery information, and in said second determining step, when it is determined that the receiving order of said print job and said outputting order of said print job are the same order, said command issuance timing is set to a timing before the generating process of said image data by said generating step is performed.

* * * * *